Patented Nov. 9, 1948

2,453,493

UNITED STATES PATENT OFFICE 2,453,493

HALOGENATED HYDROCARBON COMPOSITION

Frank M. Clark and Edward L. Raab, Pittsfield, Mass., assignors to General Electric Company, a corporation of New York No Drawing. Application June 18, 1945, Serial No. 600,214

6 Claims. (Cl. 252—63.7)

The present application is a continuation-in-part of our prior application Serial No. 440,100, filed April 22, 1942 (now abandoned).

The present invention comprises improved insulating and dielectric compositions for use in electrical devices, such for example as transformers, capacitors, cables and circuit breakers; and its object is to render innocuous deleterious decomposition products of halogenated compositions which are employed for dielectric and insulating purposes in such devices.

Electrical apparatus, such for example as transformers, switches, cables and the like, ordinarily comprise metal parts and commonly also insulating material, such for example as paper, cotton, or other cellulosic products. These two types of construction materials are both subject to chemical attack by hydrogen chloride, or other chemically active halogen compounds. The formation of rust is accelerated on iron surfaces by metallic halide compounds. Rust, or any floating metallic compounds, constitutes a hazard to the proper functioning of liquid-cooled apparatus, particularly if present in apparatus in which there is relative motion of parts. Particles of rust or similar material if loosened during the use of the apparatus may be drawn into a region of intense dielectric field by the circulation of a liquid-insulating and cooling medium, and lead to electrical breakdown and failure of the apparatus. Hydrogen halides, likewise, chemically attack paper, cotton and other cellulosic insulation, leading to increased electrical losses and decreased mechanical strength of such insulation.

In accordance with our invention, hydrogen halide formation is materially reduced and, in favorable instances, even entirely eliminated by associating halogenated hydrocarbons or mixtures thereof with a fixative consisting of polycyclic compounds containing at least one heterocyclic ring and a plurality of hetero atoms, at least one of which is nitrogen. Preferably such polycyclic stabilizers are chosen from the alkaloid group, including brucine and nicotine. The following compounds constitute additional examples of such fixatives: purine, xanthine, theobromine, caffeine, quinine, strychnine, parahydroxy phenyl morpholine, nitron, diphenyl piperazine and phenyl methyl pyrazolone. Included are derivatives of five-numbered heterocyclic ring compounds which have two hetero atoms, for example, 2-methyl-4-phenyl oxazole, and 4-phenyl-2-methyl thiazole.

Halogenated hydrocarbons of many kinds (known as askarels) have been used or proposed for electrical insulating, dielectric and heat-dissipating purposes. Examples of halogenated aryl compounds which are suitable for the insulating field are disclosed in the U. S. Letters Patent 1,931,455, patented October 17, 1933; 1,999,004, patented April 23, 1935; 2,012,301 and 2,012,302, patented August 27, 1935; 2,033,612, patented March 10, 1936; and 2,198,473, patented April 23, 1940. The liquid insulating and dielectric compositions described in these patents include chlorinated benzene and various chlorinated diaryl compounds, which are stable under normal conditions of operation of electric devices in which they are used. Such compounds, however, are subject to decomposition under abnormal conditions, for example, when an electric arc occurs in contact therewith or when they are subjected to a combination of electric stress and elevated temperatures.

The relative amount of protective fixative compound present in compositions embodying our invention depends upon the nature of the electrical apparatus and the amount of electrical arcing to which the composition will be exposed in the ordinary use of the apparatus. In some electrical devices, such, for example, as transformers, the decomposition effected by an electric arc occurs only in the event of abnormal contact of an electric arc with the halogenated composition. Arcing may never occur during the normal life of an electric transformer, and ordinarily would only be caused by such abnormal conditions as will result in failure of a transformer. In cooling and insulating compositions subjected only to occasional contact with an electric arc, amounts by weight as small as 0.1 per cent and not exceeding about two per cent of the protective agent normally are desirable for protection. In electrical switches, in which the arcing electrodes are immersed in a liquid-halogenated hydrocarbon and in which recurrent arcing occurs during the normal use of the switch, larger amounts of fixative compound are required. For example, five to ten per cent of protective stabilizer compositions advantageously may be present in compositions frequently subject to the decomposing effect of an electric arc. The stabilizer compound should be substantially insoluble in water.

Insulating paper in electrical apparatus when in contact with halogenated hydrocarbon is deleteriously affected and may even be destroyed by the presence of hydrogen halide in such hydrocarbon. Hydrogen halide may be formed by an electric discharge due to failure of the apparatus. It has been established by experience with insulating paper when in contact with a mixture of chlorinated diphenyl and trichlorbenzene contaminated by hydrogen chloride that the paper becomes blackened and loses most of its tensile strength in less than one day. Under similar conditions, except for the presence of a stabilizer such as herein described in the chlorinated composition, such paper is unaffected.

The benefits of our invention can be obtained in various ways other than by solution in the chlorinated aryl hydrocarbon. The fixative compound may be added to the halogenated composition subsequent to the occurrence of arcing. For example, the fixative compound can be added to a halogenated composition contained in a transformer or other electrical device by manual or automatic means upon the occurrence of an electrical arc, thereby causing the protective compound to immediately act upon halogen halide or other decomposition product which has been formed by the action of the arc.

What we claim as new and desire to secure by Letters Patent of the United States is:

1. A liquid composition suitable for insulating and dielectric purposes consisting essentially of the combination of normally stable halogenated aromatic hydrocarbon compounds and a fixative for halogen decomposition products consisting of a polycyclic compound containing at least one heterocyclic ring and a plurality of hetero atoms at least one of which is nitrogen, said fixative constituting at least 0.1 to 10 per cent of said composition.

2. A liquid composition suitable for insulating and dielectric purposes consisting essentially of the combination of normally stable chlorinated aromatic hydrocarbons and about 0.1 to 10 per cent of a polycyclic compound containing at least one heterocyclic ring and a plurality of hetero atoms.

3. A liquid composition suitable for insulating and cooling electrical devices consisting essentially of chlorinated diaryl hydrocarbons and about 0.1 to 2 per cent of a polycyclic compound containing at least one heterocyclic ring and a plurality of heteroatoms at least one of which is a nitrogen atom.

4. A composition consisting of chlorinated diaryl hydrocarbons and a fixative consisting of 0.1 to 10 per cent of brucine.

5. A composition consisting of chlorinated diphenyl and about 0.1 to 2 per cent of brucine.

6. A liquid composition consisting essentially of halogenated diaryl hydrocarbon compounds and about 0.1 to 10 per cent of a fixative consisting of nitron.

FRANK M. CLARK.
EDWARD L. RAAB.

REFERENCES CITED

The following references are of record in the file of this patent:

UNITED STATES PATENTS

| Number | Name | Date |
|---|---|---|
| 1,996,717 | Carlisle | Apr. 2, 1935 |
| 2,111,253 | Stoesser | Mar. 15, 1938 |
| 2,160,944 | Coleman | June 6, 1939 |
| 2,227,637 | Engelhardt | Jan. 7, 1941 |
| 2,268,146 | Hanson | Dec. 30, 1941 |